US 9,098,334 B2

(12) United States Patent
Gusev et al.

(10) Patent No.: US 9,098,334 B2
(45) Date of Patent: Aug. 4, 2015

(54) SPECIAL VALUES IN ORACLE CLUSTERWARE RESOURCE PROFILES

(75) Inventors: Andrey Gusev, Dublin, CA (US); Jonathan Creighton, Oakland, CA (US); Raj K. Kammend, Colleyville, TX (US); Sarat Kakarla, Sunnyvale, CA (US); David Brower, Alamo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 445 days.

(21) Appl. No.: 12/688,710

(22) Filed: Jan. 15, 2010

(65) Prior Publication Data

US 2011/0179169 A1    Jul. 21, 2011

(51) Int. Cl.
G06F 15/173    (2006.01)
G06F 9/50    (2006.01)

(52) U.S. Cl.
CPC .................................... *G06F 9/5011* (2013.01)

(58) Field of Classification Search
CPC ................................ G06F 9/50; G06F 9/5011
USPC .................................................. 709/224, 226
See application file for complete search history.

(56) References Cited

U.S. PATENT DOCUMENTS

| | | | |
|---|---|---|---|
| 6,154,849 A | 11/2000 | Xia | |
| 6,308,163 B1 | 10/2001 | Du et al. | |
| 6,393,485 B1 | 5/2002 | Chao et al. | |
| 6,516,350 B1 | 2/2003 | Lumelsky et al. | |
| 6,594,779 B1 | 7/2003 | Chandra et al. | |
| 6,782,408 B1 | 8/2004 | Chandra et al. | |
| 6,931,640 B2 | 8/2005 | Asano et al. | |
| 6,990,666 B2 | 1/2006 | Hirschfeld et al. | |
| 7,281,045 B2 | 10/2007 | Aggarwal et al. | |
| 7,340,578 B1 | 3/2008 | Khanzode | |
| 7,383,383 B1 | 6/2008 | Bandopadhyay et al. | |
| 7,392,421 B1 | 6/2008 | Bloomstein et al. | |
| 7,451,201 B2 | 11/2008 | Alex et al. | |
| 7,464,147 B1 | 12/2008 | Fakhouri et al. | |
| 7,480,281 B2 | 1/2009 | Hare et al. | |
| 7,484,223 B2 | 1/2009 | Hill et al. | |
| 7,581,224 B2 | 8/2009 | Romero | |
| 7,827,302 B2 | 11/2010 | Weinert et al. | |
| 7,904,756 B2 | 3/2011 | Dilman et al. | |
| 8,020,034 B1 | 9/2011 | Shrivastava et al. | |
| 8,103,635 B2 | 1/2012 | Lee et al. | |
| 8,154,554 B1 * | 4/2012 | Brown et al. | 345/522 |

(Continued)

OTHER PUBLICATIONS

Richard Strohm "Oracle Clusterware Administration and Deployment Guide, 11g Release 1 (11.1)", dated Sep. 2007.*

(Continued)

*Primary Examiner* — Vivek Srivastava
*Assistant Examiner* — Karina J Garcia-Ching
(74) *Attorney, Agent, or Firm* — Hickman Palermo Becker Bingham LLP

(57) ABSTRACT

A method and computer-readable storage representing resources in a cluster by a plurality of attribute-value pairs that together are part of a "resource profile," in which each attribute-value pair defines all, or a portion of, a management policy that applies to the resource. A clusterware manager configures a resource according to the resource profile, and follows a resource profile syntax that specifies a runtime value for the resource in which an actual value is substituted at runtime.

20 Claims, 3 Drawing Sheets

(56) References Cited

U.S. PATENT DOCUMENTS

| | | |
|---|---|---|
| 8,180,864 B2 | 5/2012 | Ghattu |
| 8,180,922 B2 | 5/2012 | Dini et al. |
| 8,364,648 B1 | 1/2013 | Sim-Tang |
| 8,364,726 B2 | 1/2013 | Georgiev |
| 8,429,450 B2 | 4/2013 | Brown et al. |
| 8,543,862 B2 | 9/2013 | Dilman et al. |
| 2002/0087665 A1 | 7/2002 | Marshall et al. |
| 2002/0120744 A1 | 8/2002 | Chellis et al. |
| 2002/0124085 A1 | 9/2002 | Matsuda et al. |
| 2002/0198984 A1 | 12/2002 | Goldstein et al. |
| 2002/0198996 A1 | 12/2002 | Sreenivasan et al. |
| 2003/0126240 A1 | 7/2003 | Vosseler |
| 2004/0226025 A1 | 11/2004 | Beaudoin et al. |
| 2005/0177628 A1 | 8/2005 | Victoria et al. |
| 2005/0188283 A1 | 8/2005 | Pomaranski et al. |
| 2005/0198275 A1* | 9/2005 | D'Alo et al. .................. 709/224 |
| 2005/0234931 A1 | 10/2005 | Yip et al. |
| 2006/0047813 A1 | 3/2006 | Aggarwal et al. |
| 2006/0053410 A1* | 3/2006 | Charisius et al. ............. 717/109 |
| 2006/0163338 A1 | 7/2006 | Allen et al. |
| 2006/0195448 A1 | 8/2006 | Newport |
| 2006/0206860 A1* | 9/2006 | Dardinski et al. ............ 717/105 |
| 2007/0168965 A1 | 7/2007 | Zenz et al. |
| 2007/0174101 A1 | 7/2007 | Li et al. |
| 2008/0021917 A1 | 1/2008 | Baker et al. |
| 2008/0052719 A1 | 2/2008 | Briscoe et al. |
| 2008/0141261 A1 | 6/2008 | Machida et al. |
| 2008/0209397 A1 | 8/2008 | Mohindra et al. |
| 2008/0222642 A1 | 9/2008 | Kakarla et al. |
| 2008/0312982 A1 | 12/2008 | Braun et al. |
| 2008/0320460 A1 | 12/2008 | Miller et al. |
| 2009/0006888 A1 | 1/2009 | Bernhard et al. |
| 2009/0037367 A1 | 2/2009 | Wein |
| 2009/0043809 A1 | 2/2009 | Fakhouri et al. |
| 2009/0054140 A1* | 2/2009 | Beser et al. ..................... 463/31 |
| 2009/0125751 A1 | 5/2009 | Dawson et al. |
| 2009/0172668 A1 | 7/2009 | Bobak et al. |
| 2009/0222540 A1 | 9/2009 | Mishra et al. |
| 2009/0290483 A1 | 11/2009 | Curtis et al. |
| 2009/0328024 A1 | 12/2009 | Li et al. |
| 2010/0064009 A1 | 3/2010 | Chen et al. |
| 2010/0107172 A1 | 4/2010 | Calinescu et al. |
| 2010/0161290 A1 | 6/2010 | Duchenay et al. |
| 2010/0241896 A1 | 9/2010 | Brown et al. |
| 2010/0257535 A1 | 10/2010 | Badovinatz et al. |
| 2010/0332659 A1 | 12/2010 | Marowsky-Bree et al. |
| 2011/0119681 A1 | 5/2011 | Spencer et al. |
| 2011/0125895 A1 | 5/2011 | Anderson et al. |
| 2011/0145392 A1 | 6/2011 | Dawson et al. |
| 2011/0179170 A1 | 7/2011 | Gusev et al. |
| 2011/0179171 A1 | 7/2011 | Gusev et al. |
| 2012/0226788 A1 | 9/2012 | Jackson |
| 2013/0024728 A1 | 1/2013 | Lee et al. |
| 2014/0149783 A1 | 5/2014 | Georgiev |

OTHER PUBLICATIONS

Strohm, Richard, "Oracle Clusterware Adminstration and Deployment Guide", 11g Release 1 (11.2), dated Aug. 2009, 322 pages.

Microsoft Computer Dictionary, dated 2002, Microsoft Press, 5th edition, 3 pages.

\* cited by examiner

SPECIAL VALUES IN ORACLE CLUSTERWARE RESOURCE PROFILES

CROSS-REFERENCE TO RELATED APPLICATIONS

Benefit Claim

This application is related to the following applications: (1) application Ser. No. 12/688,715, entitled "'Local Resource' Type As A Way To Automate Management Of Infrastructure Resources In Oracle Clusterware", filed on Jan. 15, 2010;
(2) application Ser. No. 12/688,723, entitled "Unidirectional Resource and Type Dependencies In Oracle Clusterware", filed on Jan. 15, 2010;
(3) application Ser. No. 12/688,735, entitled "Self-Testable HA Framework Library Infrastructure", filed on Jan. 15, 2010;
(4) application Ser. No. 12/688,739, entitled "Dependency On A Resource Type", filed on Jan. 15, 2010;
(5) application Ser. No. 12/688,769, entitled "Dispersion Dependency In Oracle Clusterware", filed on Jan. 15, 2010; and
(6) application Ser. No. 12/688,800, entitled "Conditional Dependency in a Computing Cluster", filed on Jan. 15, 2010, the entire contents of each of the above applications is hereby incorporated by reference as if fully set forth herein. The applicants hereby rescind any disclaimer of claim scope in the related applications.

FIELD OF THE INVENTION

The present invention relates to management of applications and resources in a clustered computing environment.

BACKGROUND

Clusterware

Clusterware is a general term that refers to a software product that is used to combine a set of nodes or computers into a single entity, all members working together as a logical unit. The single entity is referred to as a cluster or computer cluster. Clusterware allows this cluster to be controlled as a unit. For example, five nodes may be combined into a cluster, each node with its own combination of applications that may be supported by the cluster as a whole. An example of an application that may be installed on some or each of the nodes is a database management system (DBMS), such as those produced by Oracle Corporation, 500 Oracle Parkway, Redwood Shores Calif.

Clusterware may be implemented as middleware, residing between the operating system and any applications. Clusterware may also be implemented as part of the operating system. A cluster manager, or a node with management authority, manages the resources and services of a cluster. A component of the cluster manager known as the policy engine is the portion of clusterware responsible for managing services on the cluster.

Clusterware Services

Services such as membership services are provided by the clusterware. Membership determines what computers or nodes are parts of the cluster, and which computers and nodes remain in the cluster. If a node that is part of the cluster fails, for example, clusterware membership services determine which other nodes should be included in the cluster.

Resource management is another service provided by clusterware. Resource management techniques may vary with each clusterware product. In some implementations, clusterware considers everything under management as a resource, and with knowledge of resources defined in a resource profile for that resource. A resource is an allocation of hardware and storage, such as one or more operating system processes and volatile virtual memory, and/or volatile memory allocated to running a particular software module or application. In order to function properly, resources may depend on other computer components to be online and/or be configured in a certain way. Such computer components are also referred to as resources.

To manage a resource means to perform activities related to that resource. These activities may, for example, cause the resource to behave, be provisioned in a particular manner, or brought online on a particular node. For example, putting an Internet Protocol (IP) address in the proper configuration location for a web server is a way of managing an IP address, while restarting the web server is a way of managing the web server.

In some implementations, the resource profile controls what the clusterware will do when managing the resource. A resource profile is a collection of attributes having values that define the properties of the resource associated with the value. The attributes and properties may be made up of common or generic attributes and properties, or may be application specific. For example, if the resource crashes, the resource profile defines whether or not the particular resource, given the particular circumstance, will be restarted. As another example, if the resource keeps crashing, it may be relocated to another node in the cluster based on the configuration in the resource profile. Resource profiles may be grouped together to make up a logical group of profiles.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

General Overview

Resources in a cluster may be represented by a plurality of attribute-value pairs that together are part of a "resource profile," in which each attribute-value pair defines all, or a portion of, a management policy that applies to the resource. Designating some values of attributes to be evaluated at run time enhances the ability to rearrange one or more members of a cluster that hosts a resource and permits items such as scripts, binaries, and other files for the resource to be placed at different locations within each node.

A clusterware manager then configures a resource according to the resource profile, and follows a resource profile syntax that specifies a runtime value for the resource in which an actual value is substituted at runtime. Evaluation of the actual value and substitution of the actual value is not fixed in time. For example, evaluation and substitution may occur in response to a resource request, may occur upon initialization of a resource, or may occur upon termination or disconnection of a resource. Additionally, evaluation and substitution may occur in response to an action external to the resource, such as a check action performed by an application executing on a node, an operating system running on a node, or the clusterware manager itself.

Sample Cluster Hardware Organization

Figure 1:
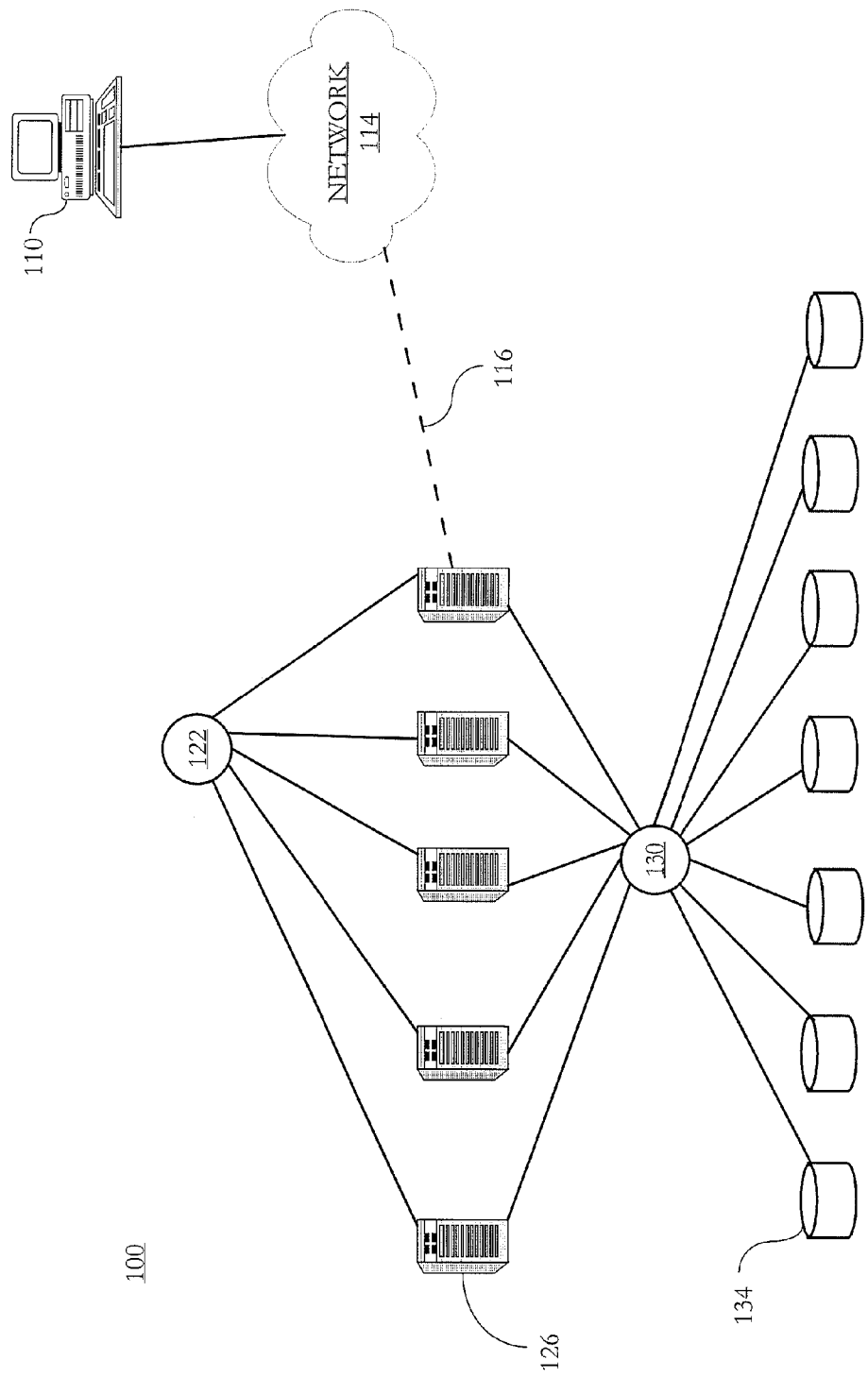
FIG. 1 illustrates hardware organization of a sample cluster upon which embodiments of the invention may be implemented.

FIG. 1 illustrates a sample cluster upon which embodiments of the invention may be implemented. Cluster 100 is includes a user group (not shown), network 114, interconnect 122, one or more clustered servers 126, switch interconnect 130, and disk subsystem 134.

Users in the user group access network 114 through physical platforms such personal computers, workstations, notebook computers, netbook computers, and handheld devices (not shown in FIG. 1) having network connectivity. Network connectivity may be provided by physically wired connections (such as Ethernet, USB, or FireWire) or may be provided by wireless connections (such as Wi-Fi, Bluetooth, or IrDA). Network 114 provides users access to one or more clustered servers 126, with sample connection illustrated by dashed line 116.

Interconnect 122 is a private local area network among one or more clustered servers 126. Interconnect 122 is used for inter-node messaging and may operate using User Datagram Protocol.

Each of one or more clustered servers 126 is connected to interconnect 122. Servers comprising each of one or more clustered servers 126 may be any computer having a network-capable operating system and providing network services. In an embodiment, servers comprising each of one or more clustered servers 126 may have different operating systems and/or architectures. In an embodiment, servers comprising each of one or more clustered servers 126 share a common operating system and common architecture, for example, 32-bit or 64-bit. Examples include blade servers (such as a Sun Ultrasparc Server Module), rackmount servers (such as a Sun Fire Server), and workstation servers (such as a Sun Ultra Workstation).

Switch interconnect 130 connects one or more clustered servers 126 to disk subsystem 134 (pictorially represented as a plurality of disks). Switch interconnect 130 comprises hardware and software that moves data from each of one or more clustered servers 126 to a desired disk in disk subsystem 134.

Disk subsystem 134 is comprised of a plurality of disks, and may comprise disks having differing physical capacities, differing operating conditions, and differing manufactures. Switch interconnect 130 permits any of one or more clustered servers 126 to access any disk in disk subsystem 130.

While FIG. 1 may appear to depict a static cluster environment, in actual operation various elements of FIG. 1 may vary over time, with the clusterware performing appropriate resource modifications. Users may connect and disconnect in an apparently random fashion, or in a predictable fashion, or in a combination thereof. Servers may be added to, or removed from, the one or more clustered servers 126. Similarly, individual disks may be added to, or removed from, disk subsystem 130. The addition or removal of servers and the addition or removal of individual disks may be planned, as in situations involving upgrades or scheduled maintenance, or may be unplanned, such as an individual disk failure occurring unpredictably.

Sample Cluster Software Organization

Figure 2:
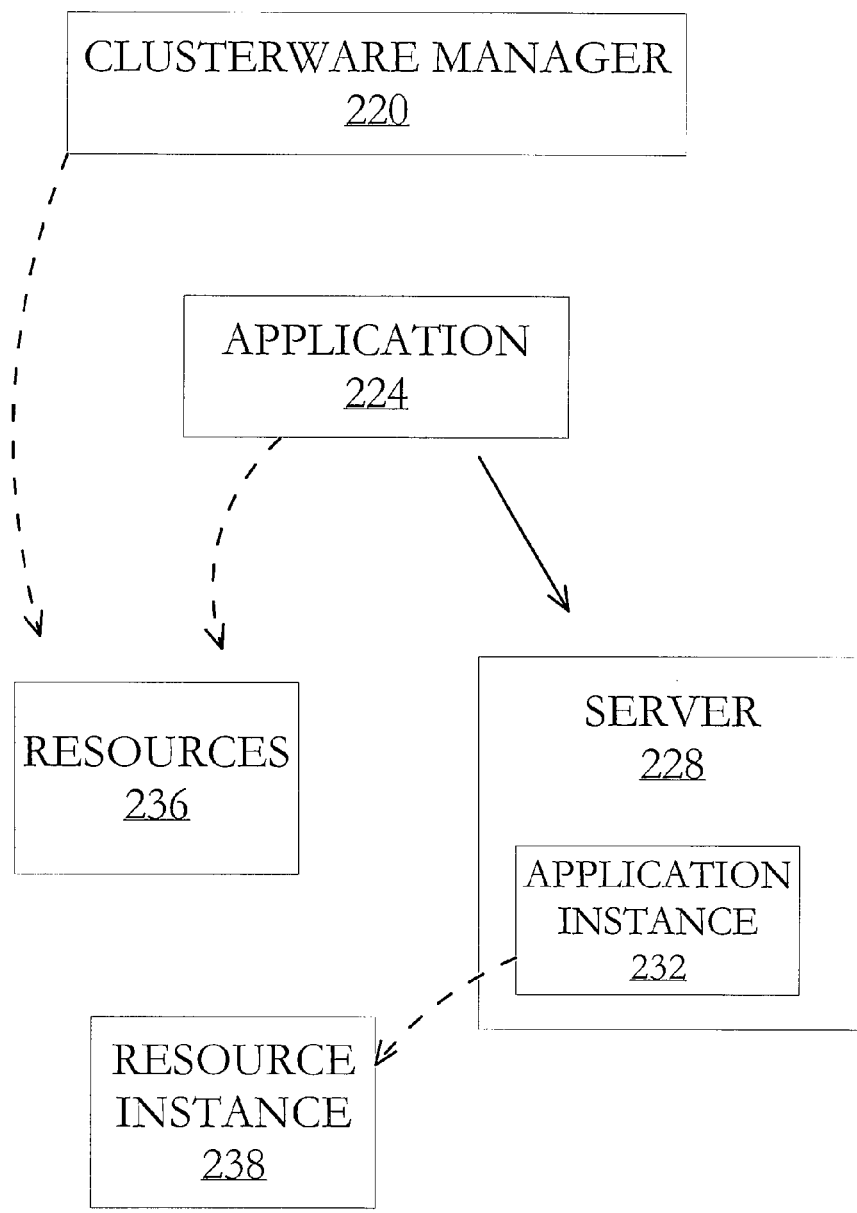
FIG. 2 illustrates a high-level software/hardware organization of a sample cluster in an embodiment of the invention.

FIG. 2 illustrates a high-level software organization of a sample cluster in an embodiment of the invention. Management and operation of cluster 100 is performed by clusterware manager 220. Components of clusterware manager 220 will be described later below. Application 224 operates in conjunction with clusterware manager 220. Application 224 represents a real-world application; in an embodiment, application 224 is a database application.

Server 228 is one of the one or more clustered servers 126 depicted in FIG. 1. Each of the one or more clustered servers 126, such as server 228, may run an application instance 232 of application 224.

Clusterware manager 220 may interact with, or control, one or more resources 236. Similarly, application instance 232, arising from application 224, may also interact with, or control, one or more resource instances 238 of a particular resource of the one or more resources 236. A particular resource (or a particular resource instance) may interact with, or be under the control of, one or both of clusterware manager 220 and application instance 232.

As previously stated, a resource comprises a physical or logical entity included in an application. A resource may comprise an individual software process; for example, an Oracle Grid Naming Service (GNS) process, an Oracle Automatic Storage Management Cluster File System (ACFS) process, a Network File System (NFS) process, or an X Clock process may be a resource. A resource may comprise an application or application instance; for example, an Oracle Automatic Storage Management (ASM) application, or an application produced by SAP, may be a resource.

As the definition of a resource is expansive, in FIG. 2, it is possible for identifiers to overlap for a particular entity. For example, in FIG. 2, server 228 may be considered as a particular resource of the one or more resources 236 with respect to clusterware manager 220.

1. Resource Profiles

Each resource in the one or more resources 236 has a resource profile (not shown in FIG. 2) that describes a management policy for the resource with respect to application 224 and cluster 100. In a non-limiting example, a resource profile may comprise a description of one or more requirements of application 224 to be provided by, and managed by, cluster 100. With knowledge of a particular resource profile, cluster 100 may monitor a resource, detect problems associated with the resource, and provide corrective action to the resource, in a manner that is transparent to, and does not affect, application 224 or application instance 232.

In an embodiment, a resource profile for a resource is represented by one or more attribute-value pairs.

In an embodiment, a resource profile comprises a plurality of attribute-value pairs that describe a management policy for a plurality of resources, in which each attribute-value pair describes a management policy for a particular resource or plurality of resources.

In an embodiment, a resource profile with respect to application 224 and cluster 110 is stored by, and managed by, clusterware manager 220.

A resource profile may include an attribute-value pair in which the value is a constant, in which the (constant) value is used to define a management policy with respect to the resource. For example, an attribute-value pair used to manage a particular resource of the one or more resources 236 might appear as follows:

RESTART_ATTEMPTS=5 and is used to enforce a policy by clusterware manager 220 in which five attempts are made to start the particular resource before indicating the particular resource is in a failed state.

A resource profile may include an attribute-value pair in which the value is not interpreted by clusterware manager 220, but is passed to a particular resource of the one or more resources 236 as part of the configuration of the particular resource. For example, an attribute-value pair used to configure a database resource might appear as follows:

DATABASE_NAME=Sales__3rd_Qtr

Upon initialization of the database resource, the database resource is provided the database name the database resource will use during operation. Another example is the attribute LISTENER_PORT, which is used to configure the port used by a particular resource.

In an embodiment, when a resource is started or modified, the contents of the resource profile are provided to the resource.

2. Resource Profiles With Runtime Values

A simple example of resource profile could be as follows: the attribute ACTION_SCRIPT contains the value of the absolute path to the script or program executed by server 228 when server 228 needs to act on the resource—for example, to start it, stop it, check its status, etc. For a particular server, the corresponding value of this attribute might be the following fixed path: /Applications/Cluster/foo/my_action_program, expressed here using a UNIX-based file naming convention. In this example, the resource profile would appear as follows:

ACTION_SCRIPT=/Applications/Cluster/foo/my_action_program

As seen above, the value of the attribute is a preconfigured, constant path. Effectively, this limits each node in a cluster that is eligible to host the resource to place the action script at exactly the same location in each node. Thus, upgrading an application, and thereby running the application from a new location, would require overhaul of all resource profiles. Similarly, any attempt to install an application at a different location in one of the nodes, would lead to application errors.

Usage of a resource profile and the accompanying benefits obtained can each be greatly expanded through addition of a syntax to the resource profile, in which the syntax provides for use of runtime values. In an embodiment, the resource profile includes a syntax in which a runtime value is defined as 'a value to-be-evaluated at run time.' At an appropriate time, such as when clusterware manager 220 needs to act on one or more resources 236, or when clusterware manager 220 receives a request from one or more resources 236, clusterware manager 220 performs a just-in-time evaluation to arrive at an actual value of the attribute.

Similarly, at an appropriate time, such as when application instance 232 needs to act on one or more resource instances 238, clusterware manager 220 performs a just-in-time evaluation to arrive at an actual value of the attribute. For each evaluation, the context in which the evaluation is performed is considered. Some illustrative examples appear below with respect to different kinds of runtime values appearing in embodiments of the invention.

The format used to designate a runtime value from within a resource profile is:

%<RuntimeValue>%

With respect to the previous example regarding the fixed path for the attribute ACTION_SCRIPT, the portability of an action script for each node can be realized by relating the path name for the action script file to the runtime value CRS_HOME. Upon evaluation, CRS_HOME provides the absolute path to a location occupied by clusterware manager 220 from which action scripts are stored. In this example, the resulting resource profile would contain the entry:

ACTION_SCRIPT=%CRS_HOME%/my_action_program

In the example above, the evaluation of runtime value CRS_HOME is performed at runtime for a particular node; thus, the path name need not be hardwired into the resource profile. Each runtime value is evaluated with respect to the context in which it appears. For example, the runtime values CRS_CSS_NODENAME and CRS_CSS_NODENUMBER are evaluated solely with respect to each server, and provide the name of the node, and the number of the node, respectively.

In an embodiment, other runtime values are evaluated with respect to the entire cluster. For example, the name of the cluster at the time of evaluation is represented by the runtime value CRS_CLUSTER_NAME. Similarly, the size of the cluster (its cardinality) at the time of evaluation is provided for by the runtime value CRS_CLUSTER_SIZE. Using the runtime value CRS_CLUSTER_SIZE, an operator may create a resource with the cardinality equal to that of the cluster, and then the operator need not reconfigure resources as nodes are added to the cluster (and thus the cardinality is increased) or as nodes are removed from the cluster (and thus the cardinality is decreased).

In an embodiment, similar runtime values permit an administrator to configure a server pool within a cluster. A "server pool" is a logical entity in the cluster that allows an administrator to allocate resources to specific applications, and is described in-part by the runtime value CRS_SERVER_POOL_SIZE, representing the size of the server pool with which the resource is tied. The value of CRS_SERVER_POOL_SIZE changes as the size of the server pool changes, when nodes enter or leave the pool. Other values with respect to a server pool include CRS_SERVER_POOL_MIN, representing the minimum allowable number of servers in the pool, CRS_SERVER_POOL_MAX, representing the maximum allowable number of servers in the pool, and CRS_SERVER_POOL_IMPORTANCE, representing the relative importance of a particular application among the applications assigned to the server pool.

Other runtime values are evaluated with respect to the operating system used by clusterware manager 220, one or more servers 228 and application 224. In an embodiment, the runtime value CRS_EXE_SUFFIX evaluates to an empty string for a UNIX-based operating system, and evaluates to the string ".exe" for the Windows-family of operating systems.

Similarly, in an embodiment, the runtime value CRS_SCRIPT_SUFFIX evaluates to an empty string for a UNIX-based operating system, and evaluates to the string ".bat" for the Windows-family of operating systems. Through instantiation of a dynamic parameter that is evaluated at runtime, such as a dynamic parameter representing operating system type, clusterware manager 220 may support heterogeneous clusters, in which nodes may run different operating systems. For example, some nodes in a heterogeneous cluster may be UNIX- or Linux-based, while other nodes in the heterogeneous cluster may be Windows-based.

3. Evaluation of Runtime Values

In an embodiment, each runtime value for a particular resource is evaluated (and thus updated) only when an explicit action is performed on the particular resource. Explicit actions may include start, stop, and clean actions, and may also include an explicit check action. Implicitly-issued check actions, such as check actions automatically performed at a particular interval, will not be updated. For example, while the evaluation of CRS_CLUSTER_SIZE may be expected to change as servers are added or removed from the cluster, and thus an explicit action is necessary to obtain the current value, for a particular node the evaluation of CRS_CSS_NODENAME is not expected to change as the node is likely to retain its original name throughout operation. Thus an implicitly-issued check action is expected to obtain the current value of the name of the node, without requiring action by clusterware manager 220.

4. Multiple Runtime Values

In an embodiment, the syntax of the attribute-value pairs permits an attribute to be evaluated with respect to multiple runtime values. For example, using runtime values it is possible to create resource profile used by server 228 as a log file that is maintained by clusterware manager 220. Previously, it was shown that the runtime value CRS_HOME evaluates to an absolute path back to clusterware manager 220 for each node. Similarly, it was shown that the runtime value CRS_CSS_NODENAME evaluates to the name of the node. Thus a resource profile for each server 228 could include the following attribute-value pair:

LOG_FILE=%CRS_HOME%/%CRS_CSS_NODENAME% in which both runtime values are evaluated to construct the name of the log file for each server. Suppose, for a particular server, CRS_CSS_NODENAME evaluates to "Snoopy5" and CRS_HOME evaluates to "/Applications/Cluster/foo/". Then the attribute LOG_FILE evaluates at runtime to:

LOG_FILE=/Applications/Cluster/foo/Snoopy5 permitting the creation and maintenance of a set of log files at a common location, with each log file identified by its corresponding server.

5. Benefits

Use of runtime values that are evaluated in a just-in-time manner provides a number of benefits in a clustered computing system. Applications, servers, and resources are freed from the complexity of maintaining critical and changing configuration information. Thus hardware and software makers can ignore these thorny implementation issues.

Similarly, the designers of clusterware manager 220 need not deal with the possibility of deferring policy decisions to software modules outside the control of clusterware manager 220. Under a centralized control provided by clusterware manager 220, the possibility of "dueling policies" in which separate components make policy decisions with respect to a particular resource, is minimized.

Under this model, downtime is significantly reduced, as each server (node) operates its own instance of the clustered application, while all instances common storage. Thus an errant server operating a clustered database application is significantly hampered from taking down the database should the server fail.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
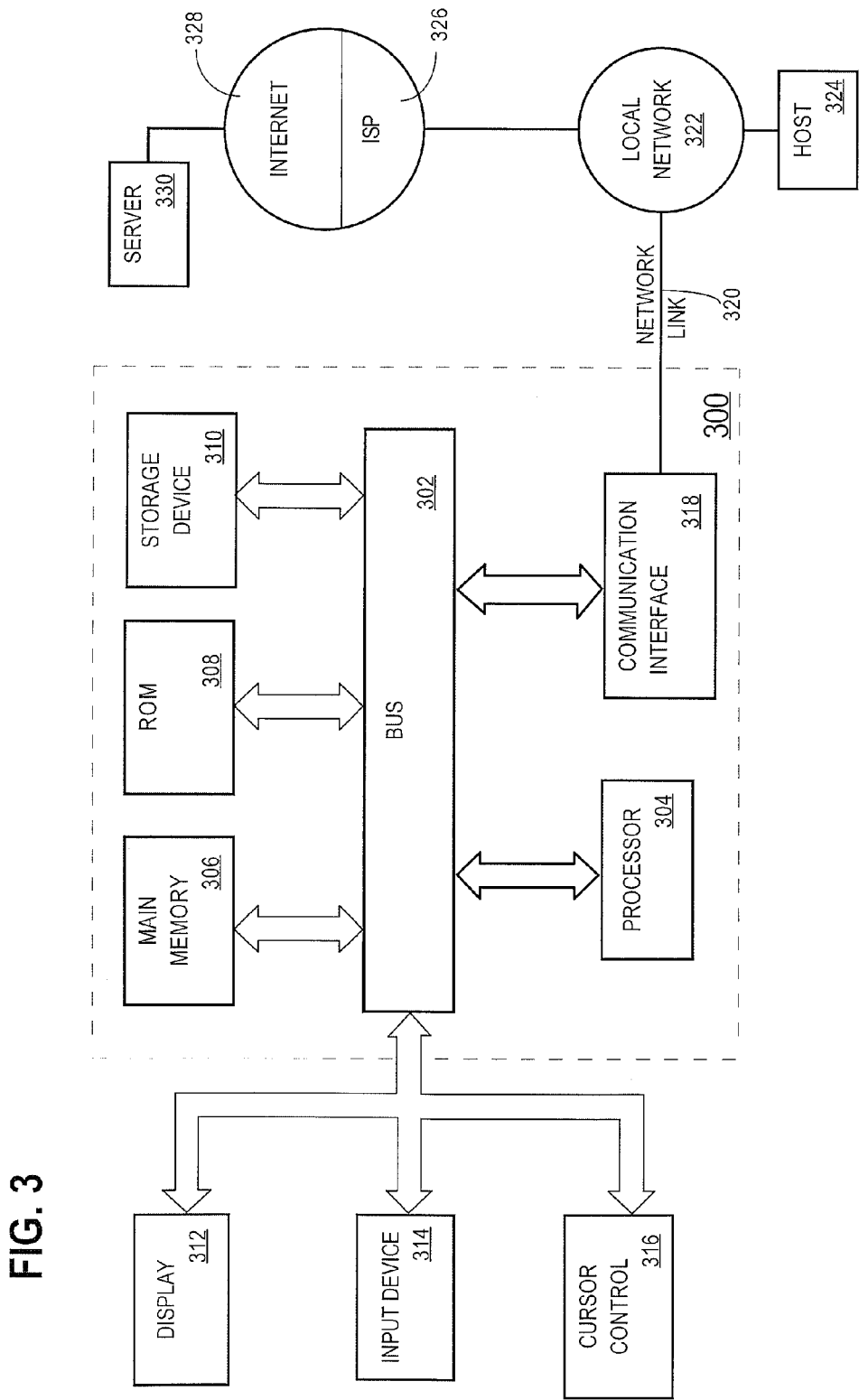
FIG. 3 illustrates a block diagram of a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine.

According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
managing, by a clusterware manager, a resource according to at least one resource attribute-value pair specified by a resource profile, wherein said resource profile includes at least one dynamic parameter,
wherein each dynamic parameter of said at least one dynamic parameter is a resource attribute value that is evaluated at runtime of an application instance utilizing the resource, and
wherein said resource profile specifies a particular dynamic parameter as the value for a particular resource attribute;
wherein managing, by the clusterware manager, the resource according to the at least one resource attribute-value pair specified by the resource profile includes:
determining a starting value for said dynamic parameter during runtime of the application instance;
configuring the resource according to said starting value;
after the application instance is started, detecting an explicit action performed on the resource during runtime of the application instance; and
in response to said detecting the explicit action performed on the resource, evaluating a runtime value for said particular dynamic parameter during runtime of the application instance, updating a value for said particular resource attribute from said starting value to said runtime value, and reconfiguring the resource according to said runtime value;
wherein the method is performed by one or more computing devices.

2. The method of claim 1, wherein the step of evaluating the runtime value comprises determining a location of the resource.

3. The method of claim 1, wherein the step of evaluating the runtime value comprises determining a relative location of the resource.

4. The method of claim 1, wherein the step of evaluating the runtime value comprises determining a location of a node associated with the resource.

5. The method of claim 1, wherein the step of evaluating the runtime value comprises determining a status of the resource.

6. The method of claim 1,
wherein said resource profile specifies a second dynamic parameter for a second resource attribute; and
wherein managing the resource according to the at least one resource attribute-value pair further includes:
determining a second starting value for said second dynamic parameter during runtime;
configuring the resource according to said second starting value;
in response to detecting the explicit action performed on the resource:
evaluating a second runtime value for the second dynamic parameter, updating a value for said the second resource attribute from the second starting value to the second runtime value, and reconfiguring the resource according to said second runtime value.

7. The method of claim 1, wherein the resource comprises an allocation of hardware and storage.

8. The method of claim 1, wherein the clusterware manager manages a heterogeneous cluster.

9. A non-transitory computer-readable storage that stores instructions which, when executed by one or more processors, cause the one or more processors to perform:
managing, by a clusterware manager, a resource according to at least one resource attribute-value pair specified by a resource profile,
wherein said resource profile includes at least one dynamic parameter,
wherein each dynamic parameter of said at least one dynamic parameter is a resource attribute value that is evaluated at runtime of an application instance utilizing the resource, and
wherein said resource profile includes a particular dynamic parameter as a value for a particular resource attribute;
wherein managing, by the clusterware manager, the resource according to the at least one resource attribute-value pair specified by the resource profile includes:
determining a starting value for said particular dynamic parameter during runtime of the application instance;
configuring the resource according to said starting value;
after the application instance is started, detecting an explicit action performed on the resource during runtime of the application instance; and
in response to said detecting the explicit action performed on the resource, evaluating a runtime value for said particular dynamic parameter during runtime of the application instance, updating a value for said particular resource attribute from said starting value to said runtime value, and reconfiguring said resource according to said runtime value.

10. The non-transitory computer-readable storage of claim 9, wherein evaluating the runtime value comprises determining a location of the resource.

11. The non-transitory computer-readable storage of claim 9, wherein evaluating the runtime value comprises determining a relative location of the resource.

12. The non-transitory computer-readable storage of claim 9, wherein evaluating the runtime value comprises determining a location of a node associated with the resource.

13. The non-transitory computer-readable storage of claim 9, wherein evaluating the runtime value comprises determining a status of the resource.

14. The non-transitory computer-readable storage of claim 9,
wherein said resource profile specifies a second dynamic parameter for a second resource attribute; and
wherein managing the resource according to the at least one resource attribute-value pair further includes:
determining a second starting value for said second dynamic parameter during runtime;
configuring the resource according to said second starting value;
in response to detecting the explicit action performed on the resource:
evaluating a second runtime value for the second dynamic parameter, updating a value for the second resource attribute from the second starting value to the second runtime value, and reconfiguring the resource according to said second runtime value.

15. The non-transitory computer-readable storage of claim 9, wherein the resource comprises an allocation of hardware and storage.

16. The non-transitory computer-readable storage of claim 9, wherein the instructions, when executed by the one or more processors, cause the clusterware manager to manage a heterogeneous cluster.

17. A method comprising:
managing, by a clusterware manager, a resource according to a resource profile by following a resource profile syntax that provides for use of dynamic parameters of attributes,
wherein the resource is a physical or logical entity used by the clusterware manager or an application running on the cluster, wherein the resource profile includes one or more attribute-value pairs for one of the resources in the cluster, wherein each attribute-value pair describes a policy for managing the resource by the clusterware manager, and wherein at least one value of an attribute is a dynamic parameter that is specified to be evaluated at runtime of an application instance utilizing the resource; and
wherein managing by a clusterware manager a resource includes, determining a starting value for a particular dynamic parameter for a particular resource attribute during runtime of the application instance;
configuring the resource according to said starting value;
after the application instance is started, detecting an explicit action performed on the resource during runtime of an application instance utilizing the resource; and
in response to said detecting the explicit action performed on the resource, evaluating a runtime value for said particular dynamic parameter during runtime of the application instance, updating a value for said particular resource attribute from said starting value to said runtime value, and reconfiguring the resource according to said runtime value;
wherein the method is performed by one or more computing devices.

18. The method of claim 1, wherein the explicit action is a stop action, or a clean action performed by the application instance on the resource during runtime of the application instance.

19. The non-transitory computer-readable storage of claim 9, wherein the explicit action is a stop action, or a clean action performed by the application instance on the resource during runtime of the application instance.

20. A non-transitory computer-readable storage that stores instructions which, when executed by one or more processors, cause the one or-more processors to perform:

managing, by a clusterware manager, a resource according to a resource profile by following a resource profile syntax that provides for use of dynamic parameters of attributes, wherein the resource is a physical or logical entity used by the clusterware manager or an application running on the cluster, wherein the resource profile includes one or more attribute-value pairs for one of the resources in the cluster, wherein each attribute-value pair describes a policy for managing the resource by the clusterware manager, and wherein at least one value of an attribute is a dynamic parameter that is specified to be evaluated at runtime of an application instance utilizing the resource; and wherein managing by a clusterware manager a resource includes, determining a starting value for a particular dynamic parameter for a particular resource attribute during runtime of the application instance;

configuring the resource according to said starting value;

after the application instance is started, detecting an explicit action performed on the resource during runtime of an application instance utilizing the resource; and in response to said detecting the explicit action performed on the resource, evaluating a runtime value for said particular dynamic parameter during runtime of the application instance, updating a value for said particular resource attribute from said starting value to said runtime value, and reconfiguring the resource according to said runtime value.

* * * * *

UNITED STATES PATENT AND TRADEMARK OFFICE
CERTIFICATE OF CORRECTION

| | |
|---|---|
| PATENT NO. | : 9,098,334 B2 |
| APPLICATION NO. | : 12/688710 |
| DATED | : August 4, 2015 |
| INVENTOR(S) | : Gusev et al. |

Page 1 of 1

It is certified that error appears in the above-identified patent and that said Letters Patent is hereby corrected as shown below:

On title page 2, column 2, under Other Publications, line 1, delete "Adminstration" and insert -- Administration --, therefor.

In the claims,

In column 10, line 47, in Claim 1, after "as" delete "the" and insert -- a --, therefor.

Signed and Sealed this
Fifteenth Day of March, 2016

Michelle K. Lee
*Director of the United States Patent and Trademark Office*